(12) United States Patent
Zaidi et al.

(10) Patent No.: US 10,341,411 B2
(45) Date of Patent: Jul. 2, 2019

(54) METHODS, SYSTEMS, AND COMPUTER READABLE MEDIA FOR PROVIDING MESSAGE ENCODE/DECODE AS A SERVICE

(71) Applicant: Oracle International Corporation, Redwood Shores, CA (US)

(72) Inventors: Syed Mohsin Reza Zaidi, Cary, NC (US); Lalit Grover, Haryana (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/473,519

(22) Filed: Mar. 29, 2017

(65) Prior Publication Data

US 2018/0288127 A1    Oct. 4, 2018

(51) Int. Cl.
*H04L 29/08* (2006.01)
*H04L 29/06* (2006.01)
*G06F 16/27* (2019.01)

(52) U.S. Cl.
CPC .............. *H04L 67/02* (2013.01); *G06F 16/27* (2019.01); *H04L 63/04* (2013.01); *H04L 63/08* (2013.01); *H04L 67/10* (2013.01); *H04L 67/1097* (2013.01); *Y02D 30/30* (2018.01)

(58) Field of Classification Search
None
See application file for complete search history.

(56) References Cited

U.S. PATENT DOCUMENTS

| 7,924,730 | B1 | 4/2011 | McAllister et al. |
| 8,005,087 | B2 | 8/2011 | Dolganow et al. |
| 8,369,334 | B2 | 2/2013 | Yu |
| 8,514,871 | B2 | 8/2013 | Anschutz et al. |
| 8,756,337 | B1 | 6/2014 | Canion et al. |
| 9,037,729 | B2 | 5/2015 | Larkin |
| 9,602,405 | B1 * | 3/2017 | Sharma ................... H04L 49/25 |

(Continued)

FOREIGN PATENT DOCUMENTS

WO    WO 00/36793    6/2000

OTHER PUBLICATIONS

Notification of Transmittal of the International Search Report and the Written Opinion of the International Searching Authority, or the Declaration for International Application No. PCT/US2018/016042 (dated Apr. 30, 2018).

Li et al., "Cloud Transcoder: Bridging the Format and Resolution Gap between Internet Videos and Mobile Devices," NOSSDAV' 12, pp. 33-38 (Jun. 7-8, 2012).

(Continued)

*Primary Examiner* — Jason Chiang
(74) *Attorney, Agent, or Firm* — Jenkins, Wilson, Taylor & Hunt, P.A.

(57) ABSTRACT

Methods, systems, and computer readable media for providing message encode/decode as a service are disclosed. According to one method for providing message encoding or decoding as a service, the method occurs at an encode/decode function (EDF) node. The method includes receiving a message encode or decode operation request containing a message identifier and an operation identifier. The method also includes performing, using the operation identifier, a message encode or decode operation involving accessing or modifying at least one TLV element decoded from a message indicated by the message identifier. The method further includes sending a response indicating whether the message encode or decode operation was successfully performed.

13 Claims, 6 Drawing Sheets

(56) References Cited

U.S. PATENT DOCUMENTS

| | | | |
|---|---|---|---|
| 9,639,714 B1* | 5/2017 | Carlson | H04L 63/0428 |
| 9,819,719 B2* | 11/2017 | Hasson | H04L 69/22 |
| 10,193,802 B2 | 1/2019 | Zaidi et al. | |
| 2002/0109879 A1* | 8/2002 | Wing So | H04J 7/00 398/58 |
| 2005/0182843 A1 | 8/2005 | Reistad et al. | |
| 2005/0242973 A1* | 11/2005 | Liebl | H03M 13/2707 341/50 |
| 2006/0129650 A1 | 6/2006 | Ho et al. | |
| 2009/0044231 A1* | 2/2009 | Oh | H03M 13/271 725/62 |
| 2010/0158009 A1 | 6/2010 | Lee et al. | |
| 2011/0228794 A1 | 9/2011 | Yong et al. | |
| 2012/0191847 A1 | 7/2012 | Nas et al. | |
| 2012/0236734 A1 | 9/2012 | Sampath et al. | |
| 2012/0327779 A1 | 12/2012 | Gell et al. | |
| 2015/0043350 A1 | 2/2015 | Basilier | |
| 2015/0201045 A1* | 7/2015 | Komirelly | H04L 69/162 709/203 |
| 2015/0310087 A1 | 10/2015 | Tidwell et al. | |
| 2015/0319095 A1 | 11/2015 | Stanwood et al. | |
| 2016/0014142 A1* | 1/2016 | Wang | H04L 12/6418 726/4 |
| 2016/0077800 A1* | 3/2016 | Zaidi | H04L 12/413 707/741 |
| 2016/0094418 A1 | 3/2016 | Raney et al. | |
| 2016/0371143 A1* | 12/2016 | Resch | H04L 63/0457 |
| 2017/0126569 A1 | 5/2017 | Seed et al. | |
| 2017/0220655 A1 | 8/2017 | Henrichs et al. | |
| 2017/0244628 A1* | 8/2017 | Chen | H04L 45/122 |
| 2018/0077057 A1 | 3/2018 | Zaidi et al. | |

OTHER PUBLICATIONS

Non-Final Office Action for U.S. Appl. No. 15/267,997 (dated Apr. 18, 2018).

Final Office Action for U.S. Appl. No. 14/485,147 (dated Jul. 31, 2017).

Non-Final Office Action for U.S. Appl. No. 14/485,147 (dated Dec. 29, 2016).

Commonly-assigned, co-pending U.S. Appl. No. 15/267,997 for "Methods, Systems, and Computer Readable Media for Processing Messages Using Stateful and Stateless Decode Strategies," (Unpublished, filed Sep. 16, 2016).

Donovan, "Diameter Routing Message Priority," RFC 7944, pp. 1-18 (Aug. 2016).

Jamil et al., "Malicious Code Detection using Deep Packet Inspection," Riphah Institute of System Engineering (RISE) Islamabad, Pakistan, https://www.academia.edu/8054586/Malicious_Code_Detection_using_Deep_Packet_Inspection?auto=download, p. 1-8 (at least as early as Jul. 2016).

Fajardo et al., "Diameter Base Protocol," RFC 6733, pp. 1-152 (Oct. 2012).

Non-Final Office Action for U.S. Appl. No. 14/485,147 (dated Jun. 6, 2018).

Advisory Action, Applicant-Initiated Interview Summary, and AFCP 2.0 Decision for U.S. Appl. No. 14/485,147 (dated Oct. 25, 2017).

Notice of Allowance and Fee(s) Due for U.S. Appl. No. 15/267,997 (dated Sep. 18, 2018).

Notice of Allowance and Fee(s) Due and Examiner-Initiated Interview Summary for U.S. Appl. No. 14/485,147 (dated Jan. 2, 2019).

Commonly-assigned, co-pending U.S. Appl. No. 16/352,738 for "Methods, Systems, and Computer Readable Media for Data Translation Using a Representational State Transfer (REST) Application Programming Interface (API)," (Unpublished, filed Mar. 13, 2019).

* cited by examiner

2

METHODS, SYSTEMS, AND COMPUTER READABLE MEDIA FOR PROVIDING MESSAGE ENCODE/DECODE AS A SERVICE

TECHNICAL FIELD

The subject matter described herein relates to processing communications. More specifically, the subject matter relates to methods, systems, and computer readable media for providing message encode/decode as a service.

BACKGROUND

Type-length-value (TLV) elements, e.g., attribute-value pair or information elements (IEs), include data constructs usable for providing information (e.g., attributes) in protocol packets or other messages. For example, a TLV element may include an identifier indicating a type or kind of information contained therein, a length of the information contained therein, and the value or information contained therein. Various communications protocols and/or data representation schemes (e.g., extensible markup language (XML)) may use TLV elements for exchanging and/or storing information. For example, Diameter and remote authentication dial in user service (RADIUS) are authentication, authorization, and accounting (AAA) protocols and use TLV elements to provide information in various messages.

Some network functions or related nodes may be configured to process (e.g., encode, decode, and/or other actions) messages containing TLV elements. For example, a Diameter routing agent (DRA) may be configured to decode an ingress message containing TLV elements, modify the TLV elements, add TLV elements, remove TLV elements, encode an egress message containing the modified TLV elements and/or the additional TLV elements, and send the egress message to a destination.

Some networks utilize a network architecture involving separating various aspects, services, or functionality of a network function into services or related components. For example, a distributed network function (DNF) (e.g., a virtualized and/or distributed node) may include one or more DNF components or instances thereof that can execute on distributed resources in a cloud computing infrastructure, a virtualized infrastructure, or other networked infrastructure. In this example, each DNF component or instances thereof may include relevant software and/or processes for performing some functionality and may be loosely coupled and/or individually scalable.

While distributed architectures allows network operators and/or service providers to deploy flexible, scalable, and feature-customized network functions, various issues can arise for such architectures when decode/encode functionality is duplicated in multiple DNF components and/or instances thereof. For example, a virtualized or distributed DRA can yield inefficient utilization of compute and input/output (I/O) resources if services and/or features are duplicated in multiple DNF components and instances thereof. Further, inefficient utilization of resources can be exacerbated when DNF components exchange messages containing large payloads during operation.

SUMMARY

Methods, systems, and computer readable media for providing message encode/decode as a service are disclosed. According to one method for providing message encoding or decoding as a service, the method occurs at an encode/decode function (EDF) node. The method includes receiving a message encode or decode operation request containing a message identifier and an operation identifier. The method also includes performing, using the at least one TLV element and the operation identifier, a message encode or decode operation involving accessing or modifying at least one TLV element decoded from a message indicated by the message identifier. The method further includes sending a response indicating whether the message encode or decode operation was successfully performed.

According to one system for providing message encode/decode as a service, the system includes at least one processor. The system also includes an EDF node. The EDF node is implemented using the at least one processor. The EDF node is configured for: receiving a message encode or decode operation request containing a message identifier and an operation identifier; performing, using the operation identifier, a message encode or decode operation involving accessing or modifying at least one TLV element decoded from a message indicated by the message identifier; and sending a response indicating whether the message encode or decode operation was successfully performed.

The subject matter described herein may be implemented in software in combination with hardware and/or firmware. For example, the subject matter described herein may be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to at least one physical computing platform including one or more processors and memory.

As used herein, the term "TLV element" refers to any information element (IE), attribute value pair (AVP), or other data construct, e.g., data encoded using abstract syntax notation (ASN) or JavaScript object notation (JSON), usable for providing information in a communication protocol packet or message.

As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

Figure 1:
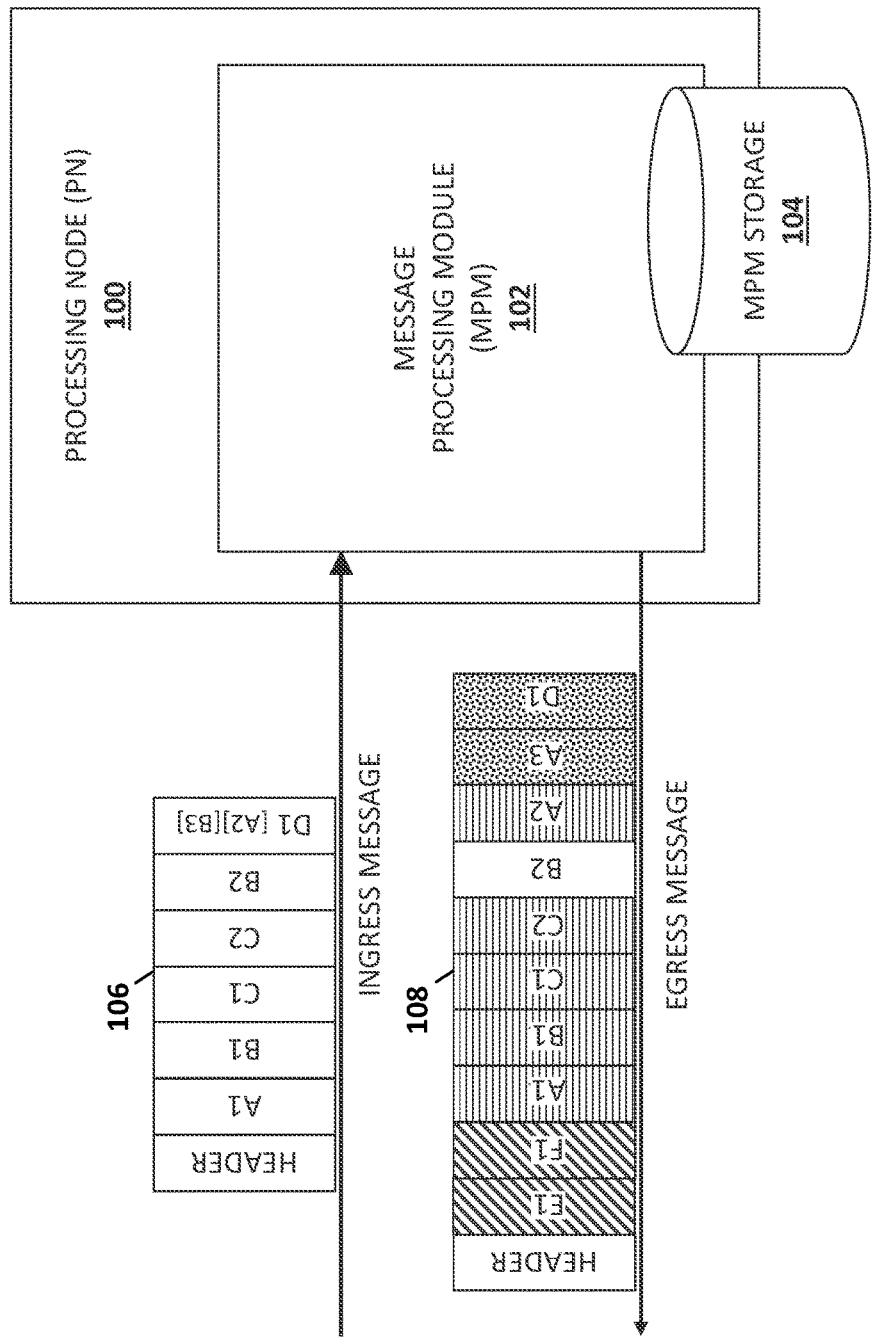
FIG. 1 is a diagram illustrating an example processing node.

The subject matter described herein relates to methods, systems, and computer readable media for providing message encode and/or decode (encode/decode) as a service. In most distributed network functions (DNFs) with loosely coupled instances of components (e.g., services), messages are encoded and/or decoded at each component boundary. For example, after a message is processed by a first component in a DNF, the first component may (re-)encode the message prior to sending the message to a second component in the DNF for additional processing, where the second component may decode the message as part of its processing. In this example, this encode-decode cycle may occur several times (e.g., the message may be decoded and encoded by multiple components in or across one or more DNFs) before the message is completely processed. The cycle of being encoded and decoded at each component or DNF boundary contributes to inefficient resource utilization, e.g., because significant compute and/or processing resources may be used to encode/decode messages repeatedly. Further, exchanging complete messages (e.g., messages including encoded payloads) between components impacts resource utilization of I/O and/or networking related resources, thereby contributing to resource utilization inefficiencies and/or network congestion.

In accordance with some aspects of the subject matter described herein, techniques, methods, systems, or mechanisms are disclosed for providing message encode/decode as a service. For example, a message encode/decode service in accordance with aspects described herein can perform message decode and encode once, and serve all component instances via common interface, e.g., via an application program interface (API), an encode and/or decode library (EDL) call, or a remote procedure call (RPC). In this example, the message encode/decode service may generate message identifiers and/or message decode metadata that can be used by other components for identifying, accessing, or referring to particular messages or message content therein, thereby minimizing the amount of data transferred between component or instances thereof during message processing.

Advantageously, in accordance with some aspects of the subject matter described herein, by using a common message encode/decode service in a distributed environment, duplicated encode/decode processing may be minimized or even eliminated and message exchanges containing large payload between components or instances thereof may be significantly reduced within (e.g., between DNF components or instances thereof) and across network functions (e.g., between DNFs) by using message identifiers (e.g., generated by the common message encode/decode service) in lieu of message payloads.

Reference will now be made in detail to various embodiments of the subject matter described herein, examples of which are illustrated in the accompanying drawings. Wherever possible, the same reference numbers will be used throughout the drawings to refer to the same or like parts.

FIG. 1 is a diagram illustrating an example processing node (PN) 100 according to an embodiment of the subject matter described herein. Referring to FIG. 1, PN 100 may include a message processing module (MPM) 102 and an MPM storage 104. PN 100 may represent any suitable entity or entities (e.g., one or more computing platforms, a computing device, and/or software executing on at least one processor) for performing one or more aspects associated with processing (e.g., encoding, modifying, and/or decoding) messages containing one or more TLV elements. For example, PN 100 may be configured to receive, process, and/or send messages containing one or more TLV elements. Example PN 100 may include, but is not limited to, a computing platform, a signaling router, a routing agent, a relay agent, a forwarding agent, a Diameter signaling router (DSR), a Diameter node, a RADIUS node, a RADIUS signaling router, a network router, a network switch, or a network device.

In some embodiments, PN 100 may include functionality for receiving and/or sending messages associated with one or more communications protocols. For example, PN 100 may include various communications interfaces for communicating with nodes using a Diameter protocol, a RADIUS protocol, a common open policy service (COPS) message, a link layer discovery protocol (LLDP), an intermediate system to intermediate system (IS-IS) protocol, and/or other protocols, e.g., signaling protocols that includes abstract syntax notation (ASN), or JavaScript object notation (JSON), or other forms of encoded data.

MPM 102 may represent any suitable entity or entities (e.g., a field-programmable gate array (FPGA), an application-specific integrated circuit (ASIC), and/or software executing on a processor) for performing one or more aspects associated with processing messages containing one or more TLV elements. For example, MPM 102 may be configured to receive, process, modify, encode, decode, and/or send messages containing one or more TLV elements. Example processing performable by MPM 102 may include identifying TLV elements and/or related attributes, modifying TLV elements and/or related attributes, and/or decoding and/or encoding messages containing TLV elements. For example, MPM 102 may decode certain TLV elements in a received message in response to receiving a request from a user or other entity. MPM 102 may also include functionality for storing information about decoded and/or detected (e.g., inspected) TLV elements, such as when using a stateful decode algorithm. For example, MPM 102 may use stored information about decoded TLV elements in generating or encoding at least some egress messages.

In some embodiments, MPM 102 may include functionality for using a stateless decode algorithm in conjunction with or in lieu of a stateful decode algorithm to decode various messages containing TLV elements. For example, a stateless decode algorithm may avoid storing or updating some, if not all, metadata when decoding messages, while a stateful decode algorithm may store or update metadata when decoding messages. In this example, since some messages may include TLV elements that are only read once and never modified, a stateless decode algorithm may be preferable for decoding since a stateful decode algorithm would potentially use more processing and memory resources and would store unnecessary metadata. Additional details regarding an example stateful decode strategy and/or related algorithms is found in U.S. patent application Ser. No. 14/485,147, entitled METHODS, SYSTEMS, AND COMPUTER READABLE MEDIA FOR PROCESSING DATA CONTAINING TYPE-LENGTH-VALUE (TLV) ELEMENTS, filed Sep. 12, 2014; the disclosure of which is incorporated herein by reference in its entirety.

In some embodiments, MPM 102 may include or access MPM storage 104. MPM storage 104 may represent any suitable entity or entities (e.g., non-transitory computer readable media, flash memory, random access memory, and/or a storage device) for storing information related to TLV elements (e.g., TLV element attributes, TLV element type information, TLV element length or size information, TLV element values, ingress offset values and/or egress offset values) and/or related data structures. For example, MPM storage 104 may store a decode iterator and/or validation information for each ingress message 106 and/or egress message 108 being processed. In some embodiments, MPM storage 104 may be external to and/or or integrated with PN 100 and/or MPM 102.

It will be appreciated that FIG. 1 is for illustrative purposes and that various data structures and/or functionality described above in relation to FIG. 1 may be changed, altered, added, or removed. For example, some nodes and/or functions may be combined into a single entity. In another example, some nodes and/or functions may be distributed across multiple nodes and/or platforms.

Figure 2:
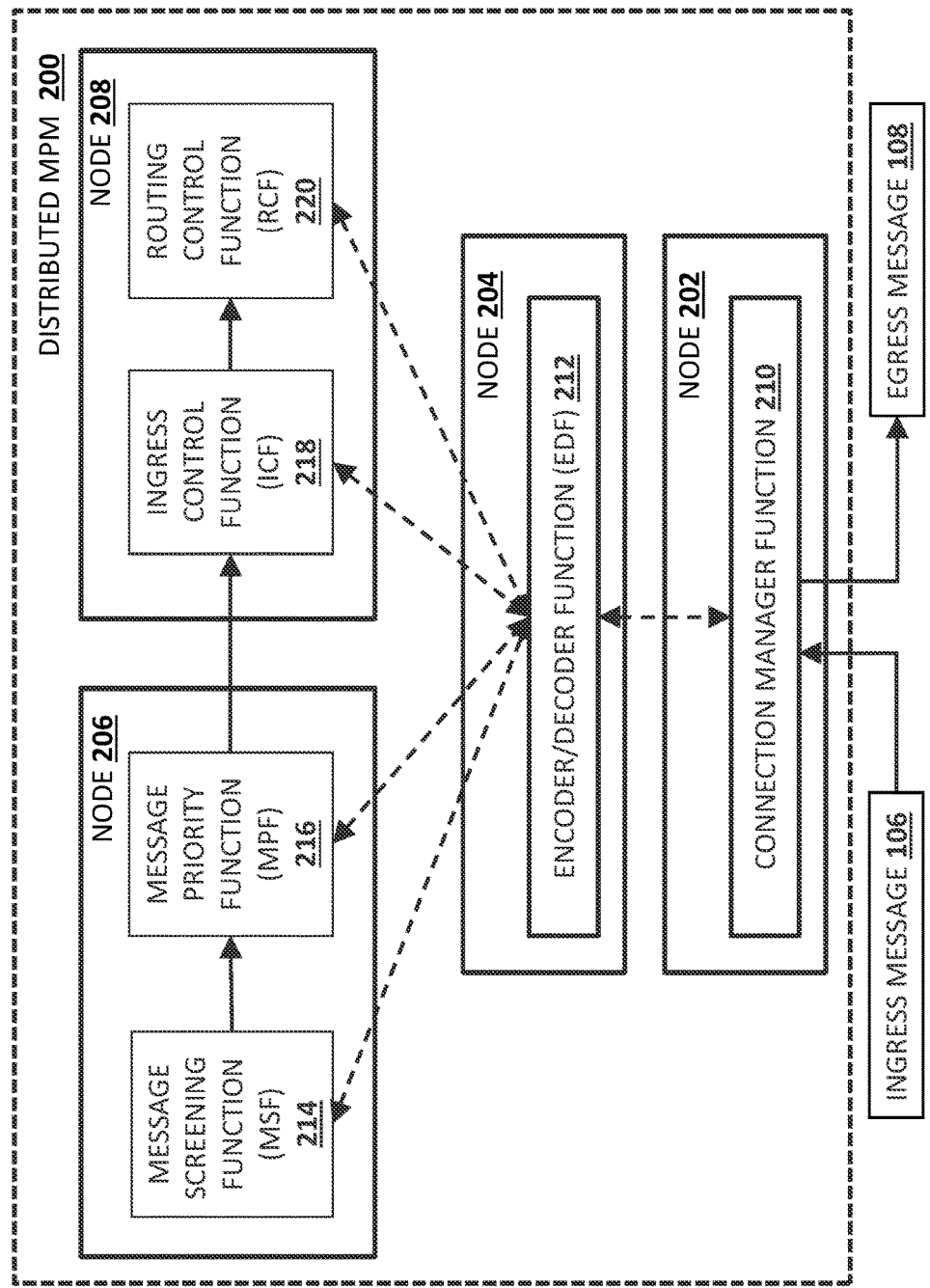
FIG. 2 is a diagram illustrating example functions in a distributed message processing module.

FIG. 2 is a diagram illustrating example functions in a distributed MPM (DMPM) 200. In some embodiments, DMPM 200 may represent a distributed network function (DNF) for performing message processing and may include functionality similar to MPM 102. For example, DMPM 200 may include various components or functions configured to receive, process, encode, decode, and/or send messages containing one or more TLV elements. Example processing performable by components or functions associated with DMPM 200 may include identifying TLV elements and/or related attributes, modifying TLV elements and/or related attributes, and/or decoding and/or encoding messages containing TLV elements.

Referring to FIG. 2, DMPM 200 may include nodes 202-208 (e.g., physical devices, computing platforms, etc.). Nodes 202-208 may include memory and/or one or more compute resources (e.g., hardware based processors) for executing one or more DNF components or related services, e.g., connection manager function (CMF) 210, encoder and/or decoder (encoder/decoder) function (EDF) 212, message screening function (MSF) 214, message priority function (MPF) 216, ingress control function (ICF) 218, and/or routing control function (RCF) 220. In some embodiments, one or more functions (e.g., DNF components) in DMPM 200 may include software or logic stored in and/or executed in a virtual environment, e.g., a virtual machine (VM) or a virtualization container (e.g., a Docker container). In some embodiments, one or more functions (e.g., DNF components) in DMPM 200 may include software or logic stored in and/or executed in a non-virtual environment, e.g., using physical resources with no virtualization software.

In some embodiments, DMPM 200 may include, utilize, or be part of a service oriented architecture (SOA). In some embodiments, EDF 212 and/or other DNF functions may be individually scaled, e.g., instances or copies of a DNF function may be created and deployed as needed. For example, as the number of messages in a network increases, multiple instances of EDF 212 may be created and deployed to handle the increased traffic. In this example, each instance of EDF 212 may provide similar encode/decode functionality and may handle a portion of the total message load. In this example, EDF 212 or instances thereof may be referred to as a service or microservice.

CMF 210 may be any suitable entity (e.g., software executing on at least one processor) for handling transport services and/or connections associated with messages. For example, CMF 210 may receive Diameter messages and perform or facilitate transport associated with processing the Diameter message. In some embodiments, CMF 210 may send the Diameter message to EDF 212 for some pre-processing and may also request a final encoded packet (e.g., after processing by various functions in DMPM 200) when transmitting the Diameter message to another DNF or processing node.

In some embodiments, CMF 210 may use one or more transport mechanisms for providing messages to other functions (e.g., EDF 212, MSF 214, MPF 216, ICF) 218, and/or RCF 220) for message processing. One example mechanism may include a push mechanism, e.g., CMF 210 may send a message indicating a new message for processing to one or more available functions. Another example mechanism may include a pull mechanism, e.g., a function may request (e.g., via an API or an RPC) a RADIUS or Diameter message to process from CMF 210. Another example mechanism may include a subscribe and publish system where an initial function subscribe to receive notices about newly available messages for processing and CMF 210 may provide or publish such notices as messages are received and ready to be processed.

In some embodiments, prior to sending messages to other functions, CMF 210 may send messages containing AVPs, TLV elements, and/or other message content to EDF 212 for (pre-)processing. For example, EDF 212 may receive a message containing AVPs, TLV elements, or other data, may decode message content therein, and may generate a message identifier for identifying the message and/or decoded message content therein. In this example, EDF 212 may decode and/or store the message content (e.g., TLV elements, AVPs, and/or metadata) in one or more data structures and may index this message content using the message identifier. Continuing with this example, after receiving the message identifier from EDF 212, CMF 210 may send processing instructions to other functions along with the message Identifier returned from EDF 212.

In some embodiments, CMF 210 may perform various transport functions and/or services. For example, CMF 210 may determine which function is to receive ingress message 106 for initial processing and may request that EDF 212 generate an encoded message or portion thereof when sending the message to another destination, e.g., another DNF or processing node.

In some embodiments, a message identifier may be exchanged between DNF components or other entities. In such embodiments, each DNF component or function can access and/or modify a relevant message by using EDF 212 (or a related API) and a related message identifier. For example, EDF 212 may provide a message identifier to CMF 210 for representing ingress message 106, e.g., a Diameter message containing AVPs. In this example, in lieu of sending ingress message 106, CMF 210 and other functions may send a partial message or a smaller sized message containing the message identifier when requesting processing from a next function in DMPM 200.

EDF 212 may be any suitable entity (e.g., software executing on at least one processor) for performing message encoding and/or decoding operations. For example, EDF 212 may provide a common interface (e.g., a representational state transfer (REST) API, an RPC, etc.) to other functions (e.g., DNF components) for accessing and/or modifying message content, e.g., packet data. In some embodiments, EDF 212 may provide storage and/or maintenance functionality for message content, e.g., AVPs, TLV elements, and/or metadata.

EDF 212 may include functionality for decoding or encoding various data constructs associated with various messages and/or protocols. Example data constructs that EDF 212 can process (e.g., decode and/or encode) include, but are not limited to, TLVs, AVPs, ASN encoded data, and/or JSON encoded data. For example, depending on the traffic received and/or a communications environment, EDF 212 and/or related entities may be configured to process Diameter message containing AVPs and/or messages with JSON encoded data.

In some embodiments, EDF 212 may include one or more communications interfaces for interacting with other functions, users, and/or nodes. For example, EDF 212 may include communications interfaces for receiving and/or sending Diameter messages, RADIUS messages, COPS messages, LLDP messages, IS-IS messages, and/or other messages. In another example, EDF 212 may include one or more communications interfaces for communicating with various DNF components and/or nodes (e.g., as represented by the dashed lines in FIG. 2 between EDF 212 and various other functions). In this example, EDF 212 may receive a processing request from an entity (e.g., via an API, an EDL call, or other mechanism) for decoding ingress messages and/or encoding egress messages or performing various message processing operations on message content.

In some embodiments, EDF 212 may be configured to provide constant-time lookups (e.g., lookups that require a similar amount of time and are not affected by the size of a data structure) of TLV elements, e.g., based on TLV attributes. For example, EDF 212 may store message related information for a given message in an associative container (e.g., an associative array, a hash map, or other related data structure) and/or other data structures that provide or allow constant-time lookups and may be indexed or identifiable by a message identifier. In another example, an associative array may include TLV instance containers (e.g., arrays or vectors containing information about TLV elements of a particular type) indexed using hash values corresponding to TLV related tags and/or TLV vendor identifiers (IDs). In this example, assuming no collisions, the lookup in the associative array may include an amount of time needed to perform a single operation and this amount of time may not change significantly regardless of the size of the associative array.

In some embodiments, EDF 212 may be configured to provide optimized (e.g., need-based or lazy) decoding of TLV elements from ingress messages (e.g., packets). For example, EDF 212 may be configured to "walk" through a packet comparing TLV attributes (e.g., TLV element tags) or validating message structure without performing any extra operations for non-matching TLV elements. In this example, EDF 212 may be configured to "walk" only as far as necessary to obtain information about a requested TLV element.

In some embodiments, EDF 212 may be configured to determine and store positions (e.g., offset values) of TLV elements in ingress messages (e.g., in one or more data structures). In such embodiments, position information may be usable to permit read-only operations without actually storing values of the TLV elements. By storing position information in lieu of storing values or other attributes of TLV elements, resources and time may be saved (e.g., by avoiding potentially expensive memory related operations in scenarios where the existence or location of a TLV element is requested but not the actual value therein).

In some embodiments, EDF 212 may be configured to provide optimized encoding of TLV elements into egress messages. For example, a stored position (e.g., an ingress offset value) of a TLV element in an ingress packet may allow for optimized encoding of an egress packet by copying non-modified TLV elements directly from the ingress packet, thereby avoiding extra operations. In another example, a position (e.g., an egress offset value) of a TLV element in an egress packet may be stored and used for copying modified/added TLV elements from a previously encoded egress packet, e.g., if such TLV elements have not been modified since the last encode, thereby avoiding extra operations.

In some embodiments, EDF 212 may use an encode iterator (e.g., a pointer object) that maintains a position (e.g., an offset value) for each message being encoded. In this example, EDF 212 may initialize a encode iterator at the beginning of a message and as TLV elements are inserted into egress message 108, EDF 212 may increment the encode iterator such that the encode iterator maintains the position for the next TLV element to be inspected in the message. In some embodiments, EDF 212 may use multiple decode iterators for egress message 108.

Ingress message 106 may represent any message (e.g., packet) containing one or more TLV elements that may be received, processed, and/or decoded by EDF 212. For example, ingress message 106 may represent a Diameter message, a RADIUS message, a COPS message, a LLDP message, or an IS-IS message. As depicted in FIG. 1, ingress message 106 may include multiple TLV elements, of the same or different types. For example, each TLV element type may be represented by a letter, such as "A", "B", "C", and/or "D". In this example, each TLV element (e.g., of a particular TLV element type) may be represented by a number after a particular letter, such as "A1", "A2", and "A3".

In some embodiments, EDF 212 may be configured to receive ingress message 106 (e.g., from CMF 210) and/or to perform one or more operations associated with processing TLV elements associated with ingress message 106. For example, EDF 212 may be configured to receive EDL related requests (e.g., a request for determining whether certain TLV elements exists in ingress message 106 and/or for determining values of certain TLV elements in ingress message 106. In response, EDF 212 may be configured to inspect TLV elements (e.g., via associated tags) in ingress message 106 and, if requested TLV elements are found, provide appropriate responses for the EDL related requests.

Egress message 108 may represent any message (e.g., a packet) containing one or more TLV elements and may be generated and/or encoded by EDF 212. For example, egress message 108 may represent a Diameter message, a RADIUS message, a COPS message, a LLDP message, or an IS-IS message. As depicted in FIG. 1, egress message 108 may include multiple TLV elements, of the same or different types. For example, each TLV element type may be represented by a letter, such as "A", "B", "C", and/or "D". In this example, each TLV element may be represented by a number after a particular letter, such as "A1", "A2", and "A3".

In some embodiments, egress message 108 may include TLV elements decoded from ingress message 106. For example, TLV elements "A1", "B1", "C1", "C2", and "A2" may be decoded from ingress message 106 and information about these TLV elements may be stored in MPM storage 104 and may be used when encoding egress message 108.

In some embodiments, egress message 108 may include TLV elements from ingress message 106 that were not decoded and/or modified. For example, TLV element "B2" may be included from ingress message 106. In this example, EDF 212 may be configured to determine that some portions of ingress message 106 may be copied directly into egress message 108.

In some embodiments, egress message 108 may include TLV elements different from or in addition to those in ingress message 106. For example, TLV elements "E1", "F1", "A3", and "D1" may be added and/or modified by EDF 212 and used when encoding egress message 108.

In some embodiments, EDF 212 may be configured to generate and/or encode egress message 108 and/or to perform one or more operations associated with processing TLV elements associated with egress message 108. For example, in response to receiving a message processing request (e.g., a message encode or decode operation (MEDO) request), EDF 212 may be configured to modify a first TLV element associated with a tag "A" (e.g., a TLV element "A1") containing a destination address for ingress message 106, to encode egress message content containing the modified TLV element, and to send egress message 108 including the encoded message content to CMF 210 where CMF 210 may send egress message 108 to another DNF or processing node. In this example, EDF 212 may modify, using one or more data structures containing information about various decoded TLV elements in ingress message 106, TLV element "A1" to include a relevant destination address and include the modified TLV element in egress message 108.

MSF 214 may be any suitable entity (e.g., software executing on at least one processor) for screening messages. For example, MSF 214 may discard or screen invalid transactions, malformed messages, or orphaned messages. In this example, MSF 214 may send a message processing request to EDF 212 for requesting one or more decoded AVPs of a Diameter message such that MSF 214 can analyze these AVPs when screening the Diameter message. In some embodiments, e.g., if MSF 214 determines that an ingress message is to be further processed, MSF 214 may send an egress message (e.g., a function request) to a next function, e.g., MPF 216. In such embodiments, the egress message may include a message identifier for identifying the message content in lieu of actual TLV elements from the ingress message.

MPF 216 may be any suitable entity (e.g., software executing on at least one processor) for assigning or determining message priorities. For example, MPF 216 may utilize a message priority scheme where "P0"-"P4" represent increasing levels of message priority. Message priority "P4" may represent the highest message priority and may be assigned to next generation networks priority services (NGN-PS) messages (e.g., messages associated with emergency first responders). Message priority "P3" may represent the second highest level of message priority and may be assigned to answer messages. Message priorities "P2", "P1", and "P0" may represent decreasing levels of message priority and any of these priorities may be assigned to request messages.

In some embodiments, MPF 216 may utilize a message priority scheme based on a Diameter routing message priority (DRMP) standard defined in Internet Engineering Task Force (IETF) Request for Comments (RFC) 7944. In some embodiments, MPF 216 may adjust message priority for messages in certain situations, e.g., in response to an overload event. For example, MPF 216 may police or monitor rates of message for various message priorities. In this example, if DMPM 200 receives more than a maximum rate (e.g., (15% of an engineered server capacity) of "P4" messages, some "P4" messages may be reassigned to "P3". Continuing with this example, if DMPM 200 receives less than the maximum rate of "P4" messages, "P4" messages may be inviolable (e.g., not reassigned) and may be allowed to bypass all congestion controls for providing guaranteed service.

ICF 218 may be any suitable entity (e.g., software executing on at least one processor) for controlling the rate and/or amount of ingress message. In some embodiments, ICF 218 may police maximum connection rates for various connections related to ingress messages and discard messages that exceed these connection rates. In some embodiments, ICF 218 may also police reserved connection rates and may color or otherwise mark messages based on whether the messages are associated with high message rate (e.g., loaded) connections, e.g., "green"=normal load, yellow=significant load, and "red"=overload detected.

In some embodiments, ICF 218 or another function may include logic for handling and/or managing traffic during overload events. In some embodiments, if DMPM 200 or a related component is experiencing overload, ICF 218 may police messages based on a predetermined message rate (e.g., an engineered or preferred message rate) and may discard messages that exceed the predetermined message rate. In some embodiments, if DMPM 200 or a related component is not experiencing overload, ICF 218 may police messages based on a maximum message rate (e.g., a rate higher than an engineered message rate) and may discard messages that exceed the maximum message rate.

RCF 220 may be any suitable entity (e.g., software executing on at least one processor) for route related processing. For example, RCF 220 may route ingress message 106 to one or more functions associated with DMPM 200 for application related processing. In another example, RCF 220 may route ingress message 106 to various other functions for determining how to process ingress message 106 and/or where to route egress message 108.

It will be appreciated that FIG. 2 is for illustrative purposes and that various entities and/or functionality described above in relation to FIG. 2 may be changed, altered, added, or removed. For example, some nodes and/or functions may be combined into a single entity, e.g., a routing functions group. In another example, some nodes and/or functions may be distributed across multiple nodes and/or platforms.

Figure 3:
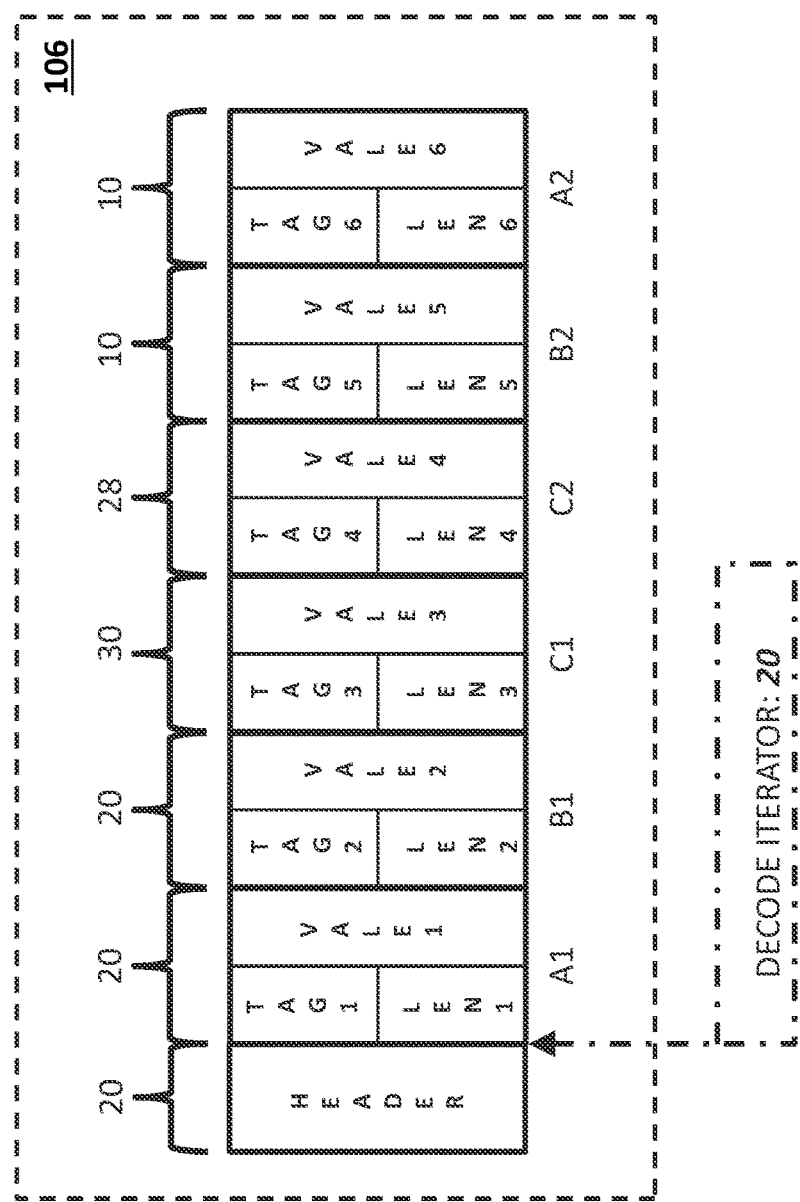
FIG. 3 is a diagram illustrating an example ingress message containing TLV elements.

FIG. 3 is a diagram illustrating ingress message 106 containing TLV elements. Referring to FIG. 3, ingress message 106 may include multiple TLV elements, e.g., "A1", "B1", "C1", "C2", "B2", and "A2". Each TLV element may include a tag attribute value representing the name or type of TLV element, a length attribute value representing the total length or size (e.g., in bytes) of the TLV element, and a value attribute value representing data of the TLV element.

In some embodiments, EDF 212 may include functionality for "walking through" messages containing TLV elements. For example, EDF 212 may use a decode iterator (e.g., a pointer object) that maintains a position (e.g., an offset value) for each message being decoded. In this example, EDF 212 may initialize a decode iterator at the beginning of a message and as TLV elements and/or related tags are inspected, EDF 212 may increment the decode iterator such that the decode iterator maintains the most recent position inspected in the message or the position to be inspected next.

In some embodiments, EDF 212 may use multiple decode iterators for a particular message. For example, EDF 212 may use a decode iterator for each TLV element type encountered. Continuing with this example, EDF 212 may use a decode iterator to quickly find a next TLV element of a particular type since EDF 212 can continue "walking through" a message from the last position inspected. In another example, where a message includes one or more nested TLV elements (e.g., TLV element 'D1' of ingress message 106 in FIG. 1), EDF 212 may use a decode iterator for each grouped/parent TLV element. In this example, the decode iterator may be usable to quickly find a next TLV element in a particular nested TLV element, e.g., TLV element 'A2' in TLV element 'D1' of ingress message 106. In some embodiments, EDF 212 may use multiple decode iterators for each nested TLV element, e.g., one decode iterator for each TLV type in the nested TLV element.

In some embodiments, EDF 212 may use a stateless decode algorithm for decoding or "walking through" ingress message 106 and may use pointer arithmetic when updating a decode iterator. For example, after inspecting a header having a length or size discernible by EDF 212, EDF 212 may start decoding ingress message 106 by reading or inspecting the first TLV element, e.g., TLV element 'A1'. In this example, EDF 212 may inspect a length attribute value of the first TLV element (e.g., "Len1"=20) and may add the length attribute value and a byte offset value (e.g., 20) representing a decode iterator for computing an updated decode iterator (e.g., 40) which may point to the next TLV element, TLV element "B1". Continuing with this example, EDF 212 may continue "walking through" ingress message 106 using the stateless decode algorithm until a particular TLV element is found or until EDF 212 determines to use a different decode algorithm, e.g., a stateful decode algorithm.

It will be appreciated that FIG. 3 is for illustrative purposes and that various entities and/or functionality described above in relation to FIG. 3 may be changed, altered, added, or removed.

Figure 4A:
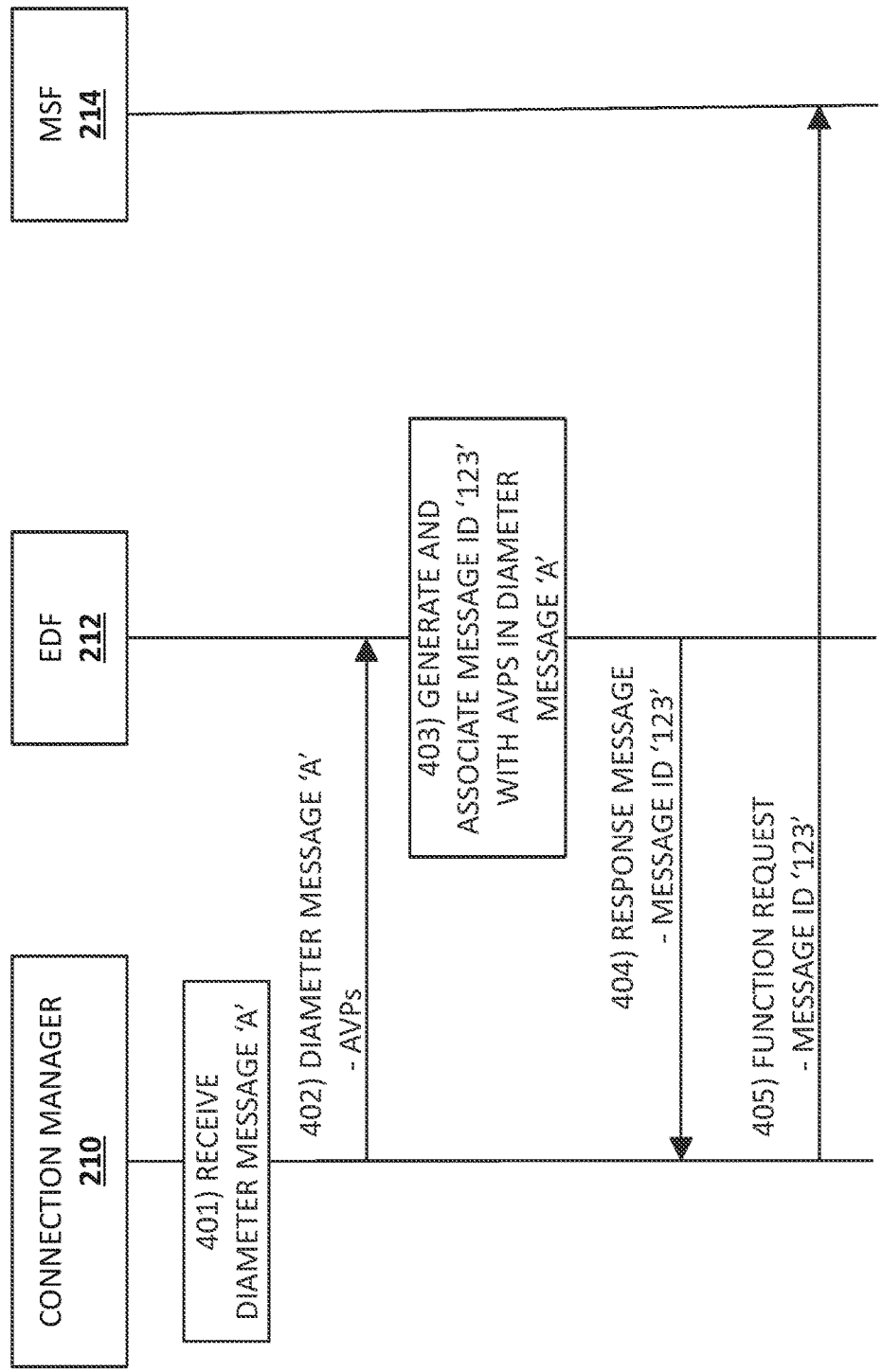
FIGS. 4A-4B are diagrams illustrating example communications associated with message processing.
Figure 4B:
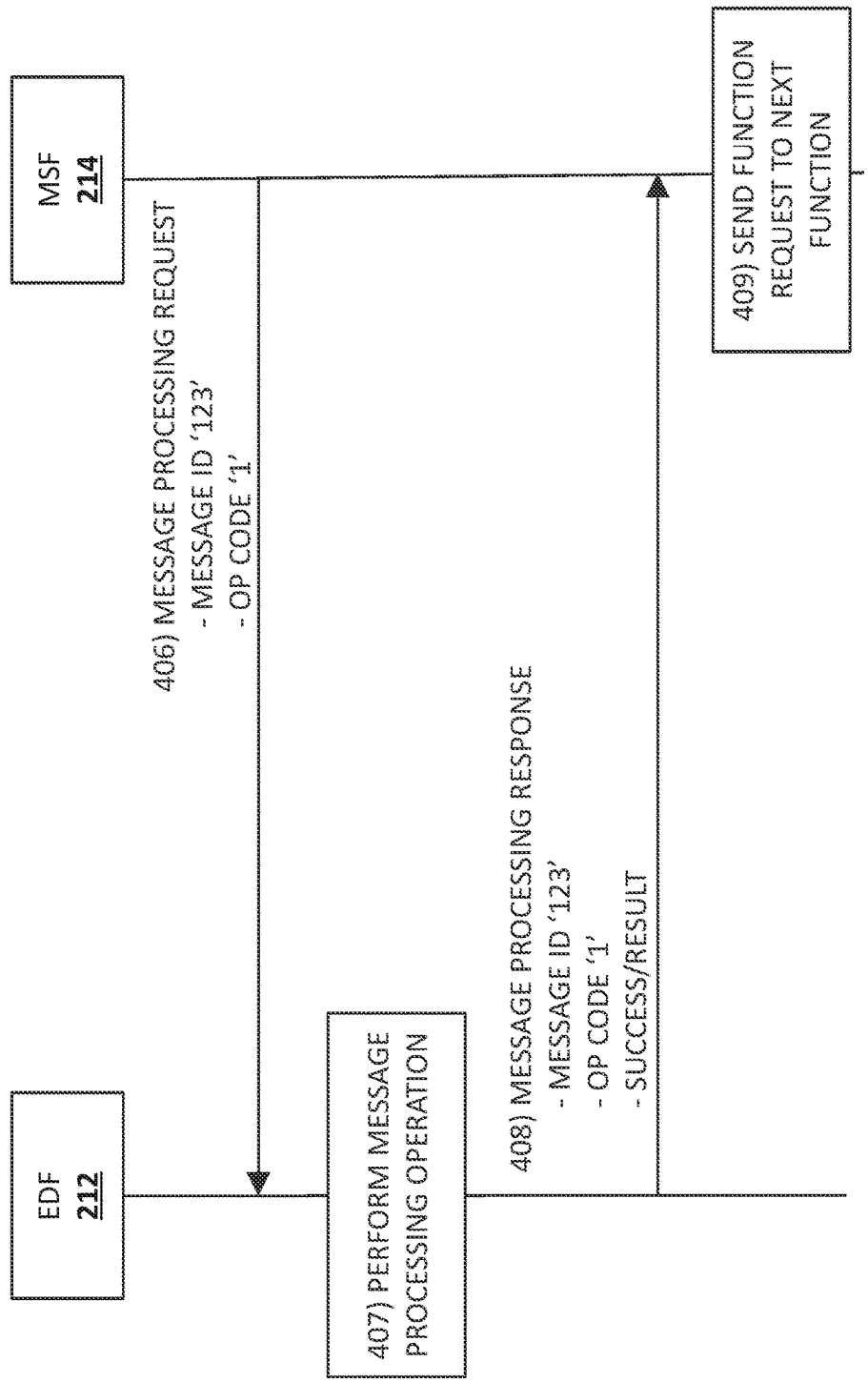

FIGS. 4A-4B are diagrams illustrating example communications associated with message processing. In some embodiments, MPM 102 or related functionality may be separated into DNF components (e.g., functions or services). In some embodiments, a set of DNF components capable of performing various aspects of message processing may be referred to collectively as DMPM 200. In some embodiments, various DNF components (e.g., CMF 210, MSF 214, MPF 216, ICF 218, and/or RCF 220) may communicate with EDF 212, where EDF 212 may perform one or more functions, actions, or services relating to message encoding, message modification, and/or message decoding. In some embodiments, one or more DNF components in DMPM 200 may be virtualized and/or implemented using VMs.

Referring to FIG. 4A, in step 401, a Diameter message 'A' may be received at CMF 210. For example, CMF 210 may receive ingress message 106.

In step 402, Diameter message 'A' may be sent from CMF 210 to EDF 212 for pre-processing. For example, EDF 212 may receive a Diameter message before it is processed by a first function (e.g., MSF 214) so that a message identifier can be generated and message content (e.g., AVPs and/or metadata) can be decoded. In this example, the decoded message content may be stored and indexed by the message identifier in one or more data structures.

In step 403, EDF 212 may generate a message identifier 'X' for uniquely identifying Diameter message 'A' and/or message content (e.g., AVPs) therein. EDF 212 may also store in a data structure an association between message identifier 'X' and message content in Diameter message 'A'.

In step 404, a response message including the generated message identifier may be sent from EDF 212 to CMF 210. For example, a response message may be sent via a REST API, an RPC, or an EDL message. In this example, the response message may include a message identifier for representing the message and/or message content therein and may be used when referencing the message by various functions (e.g., DNF components) in DMPM 200 and/or related entities.

In step 405, a function request message (e.g., via an RPC or an API call, or another messaging mechanism) may send the generated message identifier from CMF 210 to MSF 214 for processing. In some embodiments, a function request message may include a Diameter message similar to Diameter message 'A' but may include a message identifier in lieu of or instead of TLVs or other message content that are discernible by the message identifier.

Referring to FIG. 4B, in step 406, a message processing message processing request may be sent from MSF 214 to EDF 212. The message processing request may include a message identifier that indicates a message and/or message content (e.g., TLV elements) and an operation code or identifier that indicates a message processing operation to perform involving the indicated message or message content. In another example, a message processing request may include message data that is to be added and/or modified, a message identifier, and an operation code or identifier that indicates a message processing operation to perform the message modification.

Example message processing requests may include a request for encoding and/or retrieving one or more TLV elements associated with a particular message, a request for generating and/or retrieving an encoded message using one or more TLV elements associated with a particular message, a request for decoding and/or retrieving one or more TLV elements associated with a particular message, a request for decoding and/or retrieving an encoded message containing one or more TLV elements associated with a particular message, a request to modify one or more TLV elements of a particular message, a request to add one or more TLV elements of a particular message, or a request to delete one or more TLV elements of a particular message. The above example message processing requests are for illustrative purposes, not for the purpose of limitation. Further, the above example message processing requests are not intended to be an exhaustive list.

In step 407, EDF 212 may receive the message processing request and perform, using message content indicated by the message identifier, the operation indicated by the operation code. For example, using a message identifier and an operation code in a message processing request, EDF 212 may send a set of decoded AVPs to MSF 214 so that MSF 214 may determine whether a Diameter message is malformed or orphaned.

In step 408, a message processing response may be sent from EDF 212 to MSF 214. The message processing response may include the message identifier, the operation code, and a result value for indicating success and/or for providing message processing related output. For example, after receiving a message processing request from MSF 214, EDF 212 may provide a message processing response message that includes one or more decoded AVPs to MSF 214.

In step 409, after receiving a response message from EDF 212 and performing its function, MSF 214 may send a function request message (e.g., via an RPC, an API call, or another messaging mechanism) to another function (e.g., MPF 216) for further processing.

In some embodiments, after a message is completely processed by DMPM 200, CMF 210 may send a message processing request for requesting an encoded message or portion thereof such that CMF 210 may send the encoded message to another destination, e.g., another DNF.

It will be appreciated that FIGS. 4A-4B are for illustrative purposes and that different and/or additional messages and/or actions may be used for performing message processing using EDF 212 or related functionality. It will also be appreciated that various messages and/or actions described herein with regard to FIGS. 4A-4B may occur in a different order or sequence.

Figure 5:
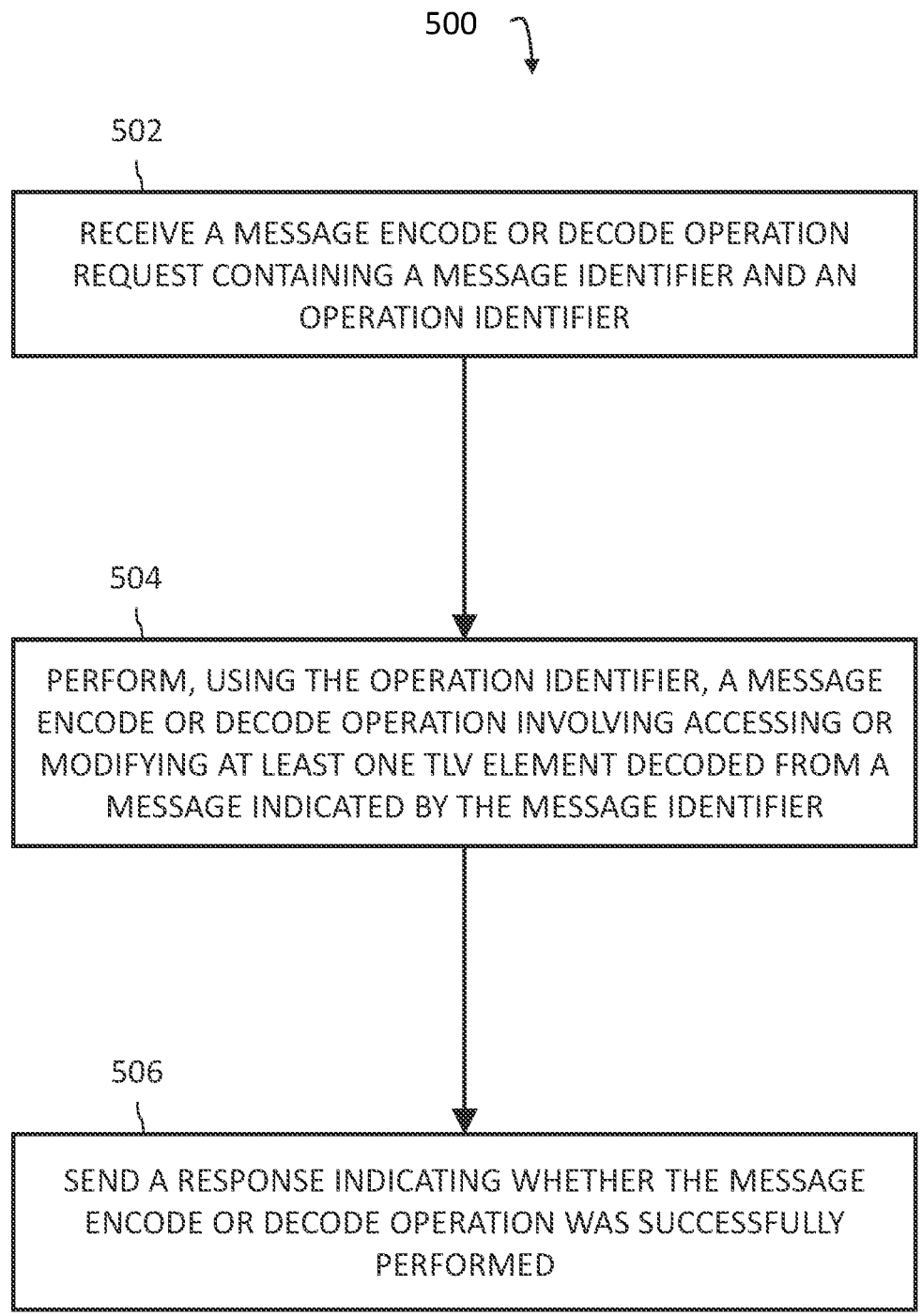
FIG. 5 is a diagram illustrating an example process for performing a message processing operation.

FIG. 5 is a diagram illustrating an example process 500 for performing a message processing operation. In some embodiments, example process 500, or portions thereof, may be performed by or at EDF 212 and/or another node, function, or module. In some embodiments, example process 500, or portions thereof, may be performed by a node or function (e.g., EDF 212) in a virtual environment. In some embodiments, example process 500 may include steps 502, 504, and 506.

Referring to example process 500, in step 502, a message encode or decode operation (MEDO) request containing a message identifier and an operation identifier may be received. For example, EDF 212 may receive a MEDO request from MSF 214. In this example, the MEDO request may include a message identifier that indicates a message and/or message content (e.g., TLV elements) and an operation code or identifier that indicates an operation to perform involving the message or message content.

In some embodiments, a MEDO request may include a request for encoding and/or retrieving one or more TLV elements associated with a particular message, a request for generating and/or retrieving an encoded message using one or more TLV elements associated with a particular message, a request for decoding and/or retrieving one or more TLV elements associated with a particular message, a request for decoding and/or retrieving an encoded message containing one or more TLV elements associated with a particular message, a request to modify one or more TLV elements of a particular message, a request to add one or more TLV elements of a particular message, or a request to delete one or more TLV elements of a particular message In some embodiments, prior to receiving the MEDO request, an EDF node may receive a first message containing at least one TLV element, may generate a message identifier for identifying the at least one TLV element, and may store an entry in a data structure that associates the message identifier and the at least one TLV element.

In some embodiments, a first message (e.g., received by an EDF node) may include a Diameter message, a RADIUS message, a COPS message, an LLDP message, an hypertext transfer protocol (HTTP) message, an AJAX message, an extensible markup language (XML) message, a representational state transfer (REST) message, a hypertext markup language (HTML) message, or an IS-IS message.

In some embodiments, a message identifier may be smaller in size than the at least one TLV element. For example, a Diameter request message may include a message payload of 1500 bytes or octets, whereas a message identifier may be 16 bytes or octets.

In some embodiments, at least one TLV element (e.g., a Diameter AVP) may include a protocol interface identifier, a related connection or path identifier, an application identifier, an origination realm, an origination address, a destination realm, a destination address, a priority related TLV element, or an NGN-PS TLV element.

In some embodiments, a MEDO request may be from a first node configured to perform a first function associated with a DNF. For example, MSF 214 may send a MEDO request while performing a message screening function for DMPM 200.

In some embodiments, a first node may send an egress message containing a message identifier to a second node configured to perform a second function associated with a DNF. For example, after performing a message screening function, MSF 214 may send a message containing a message identifier to MPF 216 for message priority related processing. In this example, MPF 216 may also send a MEDO request to EDF 212 when performing its function.

In some embodiments, a DNF may include a computing platform, a signaling router, a routing agent, a relay agent, a DSR, a DRA, a Diameter node, a RADIUS node, a RADIUS signaling router, a network router, a network switch, a virtualized node, a virtualized DSR, a virtualized DRA, a virtualized signaling router, a network device, or a security and/or firewall agent. For example, DMPM 200 may represent a virtualized and/or distributed DRA.

In step 504, a MEDO may be performed using the operation identifier, where the MEDO may involve accessing or modifying at least one TLV element decoded from a message indicated by the message identifier. For example, EDF 212 may access a data structure containing decoded message payloads (e.g., TLV elements therein) indexed by unique message identifiers. In this example, EDF 212 can identify one or more TLV elements associated with a message identifier in a MEDO request and EDF 212 may perform an operation involving the identified TLV elements based on an operation code in the MEDO request.

In step 506, a response may be sent indicating whether the MEDO was successfully performed. For example, after performing an operation involving ingress message 106, EDF 212 may send a MEDO response indicating that the operation was successful and/or include some relevant output (e.g., a decoded parameter value) to a requester, e.g., MSF 214. In some embodiments, retrieved message content or other data sent in a MEDO response may be an indication that the MEDO was successfully performed.

In some embodiments, an EDF node may receive a second MEDO request containing a message identifier and a second operation identifier indicating a second operation to perform on the at least one TLV element. For example, after receiving a message containing a message identifier from MSF 214, MPF 216 may send a MEDO request to EDF 212 which includes the message identifier and an operation code indicating a particular operation involving one or more particular TLV elements.

In some embodiments, EDF 212 and/or other DNF components in DMPM 200 may include a VM or a VM instance executing using virtualization technology. For example, EDF 212 may include software executable by node 204 in a virtual environment, e.g., using virtual resources and a hypervisor.

In some embodiments, EDF 212 and/or other DNF components in DMPM 200 may include software executing using physical resources without using virtualization technology. For example, EDF 212 may include software executable by node 204 in a non-virtual environment.

In some embodiments, EDF 212 may be associated with DMPM 200. For example, DMPM 200 may represent a DNF, e.g., a signaling router, a routing agent, a relay agent, a forwarding agent, a DSR, a Diameter node, a RADIUS node, a RADIUS signaling router, a network router, a network switch, a network device, or a security and/or firewall agent. In this example, DMPM 200 and/or related DNF components therein may be implemented using one or more processors, nodes, or computing platforms.

It should be noted that EDF 212, node 204, and/or functionality described herein may constitute a special purpose computing device. Further, EDF 212, node 204, and/or functionality described herein can improve the technological field of processing messages containing various data constructs or encoded data, including techniques for decoding and/or encoding TLV elements.

The subject matter described herein for providing message encode/decode as a service can improve the functionality of a message processor and related nodes by providing for more efficient resource (e.g., compute, network, and/or memory) utilization and improved processing speeds. Further, by using EDF 212, node 204, or related functionality, message processing (e.g., packet decoding and encoding) logic can be decoupled from a network element (e.g., a DSR, a signaling router, MPM 102, DMPM 200, etc.), thereby significantly reducing the amount of compute resources required by the network element and providing significant savings across the network functions. For example, using a common decoding/encoding service eliminates the need for exchanging a complete packet (e.g., a packet containing an encoded payload of TLV elements) between DNF components (e.g., nodes) in a DNF (e.g., DMPM 200) or between DNFs, thereby saving both input/output (I/O) bandwidth and compute resources required for decoding/encoding the packet at component and/or DNF boundaries. In this example, resource and utilization savings offset the I/O and compute cost of operating and communicating with the decoding/encoding service, especially in the presence of large payloads. Furthermore, by using EDF 212, node 204, or related functionality across DNFs (and their constituent components), consumption of I/O bandwidth and compute resources can be optimized on an even larger scale.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing message encoding or decoding as a service, the method comprising:
    at an encode/decode function (EDF) node:
        receiving a message containing at least one type-length-value (TLV) element, wherein the at least one TLV element includes a protocol interface identifier, a related connection or path identifier, an application identifier, an origination realm, an origination address, a destination realm, a destination address, a priority related TLV element, or a next generation networks priority services (NGN-PS) TLV element;
        decoding at least a portion of the message;
        generating a message identifier for identifying the message or related message content;
        receiving a message encode or decode operation request containing the message identifier and an operation identifier, wherein the message encode or decode operation request includes the message identifier in lieu of a message payload to be operated on, wherein the message encode or decode operation request is from a first node configured to perform a first function associated with a distributed network function (DNF);
        querying, using the message identifier, a data structure to obtain decoded message content including the at least one TLV element;
        performing, using the operation identifier, a message encode or decode operation involving modifying the at least one TLV element decoded from the message indicated by the message identifier; and
        sending a response indicating whether the message encode or decode operation was successfully performed.

2. The method of claim 1 wherein the message includes a Diameter message, a remote authentication dial in user service (RADIUS) message, a common open policy service (COPS) message, a link layer discovery protocol (LLDP) message, an hypertext transfer protocol (HTTP) message, an AJAX message, an extensible markup language (XML) message, a representational state transfer (REST) message, a hypertext markup language (HTML) message, or an intermediate system to intermediate system (IS-IS) message.

3. The method of claim 1 wherein the message encode or decode operation request includes a request for encoding and/or retrieving one or more TLV elements associated with a particular message, a request for generating and/or retrieving an encoded message using one or more TLV elements associated with a particular message, a request for decoding and/or retrieving one or more TLV elements associated with a particular message, a request for decoding and/or retrieving an encoded message containing one or more TLV elements associated with a particular message, a request to modify one or more TLV elements of a particular message, a request to add one or more TLV elements of a particular message, or a request to delete one or more TLV elements of a particular message.

4. The method of claim 1 wherein the first node sends an egress message containing the message identifier to a second node configured to perform a second function associated with the DNF.

5. The method of claim 1 wherein the DNF includes a computing platform, a signaling router, a routing agent, a relay agent, a forwarding agent, a Diameter signaling router (DSR), a Diameter node, a remote authentication dial in user service (RADIUS) node, a RADIUS signaling router, a network router, a network switch, a virtualized node, a virtualized DSR, a virtualized signaling router, a network device, or a security and/or firewall agent.

6. The method of claim 1 comprising:
    at an encode/decode function (EDF) node:
        receiving a second a message encode or decode operation request containing the message identifier and a second operation identifier indicating a second operation to perform on the at least one TLV element.

7. A system for providing message encoding or decoding as a service, the system comprising:
    at least one processor; and
    an encode/decode function (EDF) node implemented using the at least one processor, wherein the EDF node is configured for:
        receiving a message containing at least one type-length-value (TLV) element, wherein the at least one TLV element includes a protocol interface identifier, a related connection or path identifier, an application identifier, an origination realm, an origination address, a destination realm, a destination address, a priority related TLV element, or a next generation networks priority services (NGN-PS) TLV element;
        decoding at least a portion of the message;
        generating a message identifier for identifying the message or related message content;
        receiving a message encode or decode operation request containing the message identifier and an operation identifier, wherein the message encode or decode operation request includes the message identifier in lieu of a message payload to be operated on, wherein the message encode or decode operation request is from a first node configured to perform a first function associated with a distributed network function (DNF);

querying, using the message identifier, a data structure to obtain decoded message content including the at least one TLV element;

performing, using the operation identifier, a message encode or decode operation involving modifying the at least one TLV element decoded from the message indicated by the message identifier; and sending a response indicating whether the message encode or decode operation was successfully performed.

8. The system of claim 7 wherein the message includes a Diameter message, a remote authentication dial in user service (RADIUS) message, a common open policy service (COPS) message, a link layer discovery protocol (LLDP) message, an hypertext transfer protocol (HTTP) message, an AJAX message, an extensible markup language (XML) message, a representational state transfer (REST) message, a hypertext markup language (HTML) message, or an intermediate system to intermediate system (IS-IS) message.

9. The system of claim 7 wherein the message encode or decode operation request includes a request for encoding and/or retrieving one or more TLV elements associated with a particular message, a request for generating and/or retrieving an encoded message using one or more TLV elements associated with a particular message, a request for decoding and/or retrieving one or more TLV elements associated with a particular message, a request for decoding and/or retrieving an encoded message containing one or more TLV elements associated with a particular message, a request to modify one or more TLV elements of a particular message, a request to add one or more TLV elements of a particular message, or a request to delete one or more TLV elements of a particular message.

10. The system of claim 7 wherein the first node sends an egress message containing the message identifier to a second node configured to perform a second function associated with the DNF.

11. The system of claim 7 wherein the DNF includes a computing platform, a signaling router, a routing agent, a relay agent, a forwarding agent, a Diameter signaling router (DSR), a Diameter node, a remote authentication dial in user service (RADIUS) node, a RADIUS signaling router, a network router, a network switch, a virtualized node, a virtualized DSR, a virtualized signaling router, a network device, or a security and/or firewall agent.

12. The system of claim 7 wherein the EDF node is configured for:

receiving a second a message encode or decode operation request containing the message identifier and a second operation identifier indicating a second operation to perform on the at least one TLV element.

13. A non-transitory computer readable medium comprising computer executable instructions embodied in the non-transitory computer readable medium that when executed by at least one processor of a computer cause the computer to perform steps comprising:

at an encode/decode function (EDF) node:

receiving a message containing at least one type-length-value (TLV) element, wherein the at least one TLV element includes a protocol interface identifier, a related connection or path identifier, an application identifier, an origination realm, an origination address, a destination realm, a destination address, a priority related TLV element, or a next generation networks priority services (NGN-PS) TLV element;

decoding at least a portion of the message;

generating a message identifier for identifying the message or related message content;

receiving a message encode or decode operation request containing the message identifier and an operation identifier, wherein the message encode or decode operation request includes the message identifier in lieu of a message payload to be operated on, wherein the message encode or decode operation request is from a first node configured to perform a first function associated with a distributed network function (DNF);

querying, using the message identifier, a data structure to obtain decoded message content including the at least one TLV element;

performing, using the operation identifier, a message encode or decode operation involving modifying the at least one TLV element decoded from the message indicated by the message identifier; and sending a response indicating whether the message encode or decode operation was successfully performed.

* * * * *